(12) United States Patent
Mao et al.

(10) Patent No.: US 7,496,937 B2
(45) Date of Patent: Feb. 24, 2009

(54) SAFETY DEVICE AND STORAGE MEDIUM PLAYER HAVING THE SAME

(75) Inventors: Jun-Feng Mao, Guangdong (CN); Wen-Jie Bao, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 430 days.

(21) Appl. No.: 11/306,972

(22) Filed: Jan. 17, 2006

(65) Prior Publication Data

US 2006/0282843 A1   Dec. 14, 2006

(30) Foreign Application Priority Data

Jun. 10, 2005   (CN) .................... 2005 1 0035279

(51) Int. Cl.
*G11B 19/22* (2006.01)
*G11B 33/12* (2006.01)

(52) U.S. Cl. ................. 720/655; 369/30.36; 369/53.45; 369/78

(58) Field of Classification Search ............... 369/30.27, 369/30.36, 53.3, 53.38, 53.41, 53.42, 53.45, 369/78; 720/655
See application file for complete search history.

(56) References Cited

U.S. PATENT DOCUMENTS

| | | | |
|---|---|---|---|
| 4,815,066 A | | 3/1989 | Horvath |
| 5,870,367 A | * | 2/1999 | Yamamori ................ 720/669 |
| 5,943,308 A | * | 8/1999 | Foo ........................ 720/600 |
| 6,188,660 B1 | * | 2/2001 | Yamamori ................ 720/600 |
| 6,731,580 B1 | * | 5/2004 | Sato et al. ................ 720/655 |
| 6,785,896 B2 | | 8/2004 | Huang |
| 6,868,548 B2 | * | 3/2005 | Lin ........................ 720/657 |
| 2001/0021158 A1 | | 9/2001 | Sanada et al. |
| 2002/0131355 A1 | * | 9/2002 | Lin ........................ 369/75.1 |
| 2003/0152010 A1 | * | 8/2003 | Liao et al. ............... 369/75.1 |
| 2004/0062172 A1 | | 4/2004 | Huang |
| 2004/0076102 A1 | | 4/2004 | Huang |
| 2004/0165487 A1 | | 8/2004 | Liao et al. |
| 2005/0237892 A1 | * | 10/2005 | Kuo et al. ............... 369/75.21 |
| 2005/0249069 A1 | * | 11/2005 | Aoki et al. ............... 369/47.1 |

FOREIGN PATENT DOCUMENTS

| | | | |
|---|---|---|---|
| JP | 57162148 A | * | 10/1982 |
| JP | 62047920 A | * | 3/1987 |

(Continued)

*Primary Examiner*—William J Klimowicz
(74) *Attorney, Agent, or Firm*—Winston Hsu

(57) ABSTRACT

A storage medium player includes a base defining a medium-receiving area, a driving device mounted in the base for driving a medium, a cover pivotably attached to the base adjacent one side of the medium-receiving area, and a safety device mounted in the base adjacent an opposite side of the medium-receiving area. The safety device is capable of being switched between an activated state and a deactivated state upon pivoting the cover with respect to the base. When the cover is closed, the safety device is in the activated state and the driving device is enabled. When the cover is open, the safety device is in the deactivated state and the driving device is disabled.

17 Claims, 5 Drawing Sheets

FOREIGN PATENT DOCUMENTS

| | | | | |
|---|---|---|---|---|
| JP | 01151049 | A | * | 6/1989 |
| JP | 01176358 | A | * | 7/1989 |
| JP | 02177054 | A | * | 7/1990 |
| JP | 06005062 | A | * | 1/1994 |
| JP | 07037324 | A | * | 2/1995 |
| JP | 11126409 | A | * | 5/1999 |
| JP | 2000163864 | A | * | 6/2000 |
| JP | 2002352571 | A | * | 12/2002 |
| JP | 2003-123454 | | | 4/2003 |
| JP | 2004055045 | A | * | 2/2004 |
| TW | 416337 | | | 12/2000 |
| TW | 516024 | | | 1/2003 |
| TW | 559033 | | | 10/2003 |

* cited by examiner

SAFETY DEVICE AND STORAGE MEDIUM PLAYER HAVING THE SAME

FIELD OF THE INVENTION

The present invention relates to storage medium players and, more particularly, to a safety device for a storage medium player.

DESCRIPTION OF RELATED ART

Generally, storage medium players, such as digital versatile disc (DVD) players and compact disc (CD) players, can be classified into three types: tray type, slot-in type, and cover-type. A traditional cover-type storage medium player includes a base, an electronic unit mounted in the base, and a cover pivotally connected to the base. The base defines a medium-receiving area in a top plate thereof. The cover is provided for selectively covering or exposing the medium-receiving area. The electronic unit includes a turntable for carrying a medium, a pick-up head for reproducing information recorded on the medium, and a driving device (e.g. a spindle motor) for driving the turntable to rotate. A lock assembly mounted on the base is utilized for engaging with the cover so as to firmly position the cover at a closed position.

When the lock assembly is manipulated, the cover can be rotated to an open position by elastic force or manual power. The medium-receiving area is thus exposed so that a user can insert or remove a medium. When the cover is rotated to the closed position, it is firmly locked to the base by the lock assembly.

During operation, the driving device drives the turntable holding the medium to rotate at a high velocity. The pick-up head directs a laser onto the medium to reproduce data. However, when a user tries to open the cover and reach for the medium as it is rotating, the user may be hurt by a thin, sharp edge of the medium.

Therefore, a safety device is needed to stop the rotation of the medium when the cover is opened.

SUMMARY OF INVENTION

A storage medium player includes a base and a cover pivotally connected to the base. The base includes a medium-receiving area, a driving device for rotating a medium received in the medium-receiving area, and a safety device connected in series with the driving device. The cover is configured for selectively covering the medium-receiving area. The safety device is capable of toggling between an activated state and a deactivated state. When the cover is closed, the safety device is in the activated state and the driving device is enabled. When the cover is open, the safety device is in the deactivated state and the driving device is disabled.

Other advantages and novel features will become more apparent from the following detailed description of preferred embodiments when taken in conjunction with the accompanying drawings, in which:

DETAILED DESCRIPTION

Figure 1:
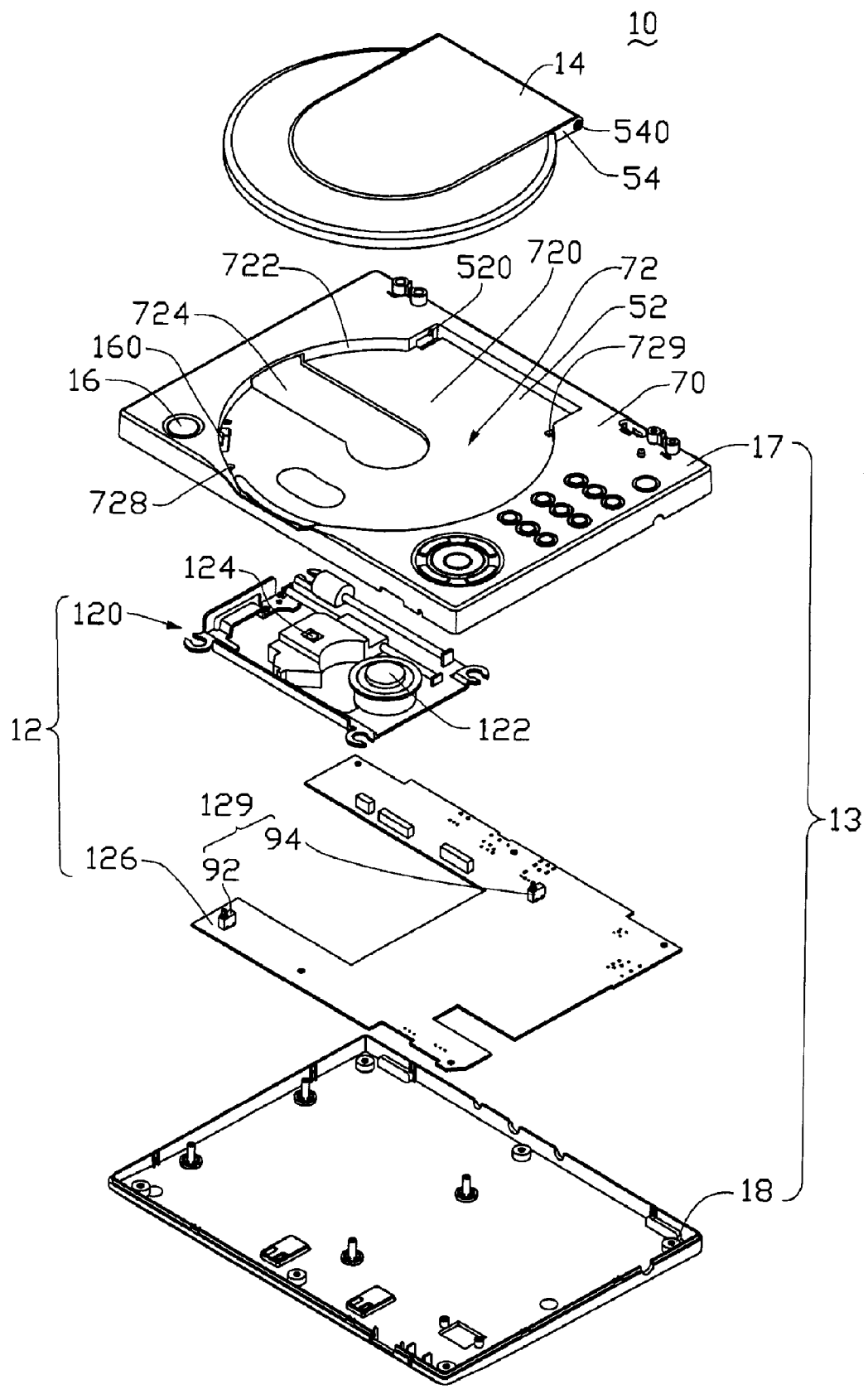
FIG. 1 is an exploded, isometric view of a storage medium player in accordance with an exemplary embodiment.

Referring to FIG. 1, a storage medium player 10 includes a main module 12, a base 13 for housing the main module 12, and a cover 14 pivotally connected to the base 13.

The main module 12 includes a driving device 120 for rotatably supporting a medium (not shown) thereon, a pick-up unit 124 for reproducing information recorded on the medium, a printed circuit board (PCB) 126, and a safety device 129. The PCB 126 is electrically connected to the driving device 120, the pick-up unit 124, and the safety device 129. The PCB 126 includes a control circuit (not shown) for controlling operation of the storage medium player 10. The driving device 120 is electrically connected in series with the safety device 129 in the control circuit. The driving device 120 is capable of toggling between a first working state and a second working state. In the first working state, the driving device 120 is ready to rotate the medium when given a PLAY command. On the contrary, when in the second working state, the driving device 120 is unable to work even if it receives a PLAY command because a power supply to the driving device 120 is cut off. The safety device 129 is used for controlling the working states of the driving device 120. When the safety device 129 is activated, the driving device 120 is in the first working state. On the contrary, when the safety device 129 is deactivated, the driving device 120 is in the second working state.

The base 13 includes a lock assembly 16, an upper housing portion 17, and a lower housing portion 18. The upper housing portion 17 is substantially rectangle, and includes a top plate 70. The lock assembly 16 is formed at a front edge of the base 13. The lock assembly 16 is provided for selectively locking the cover 14 in a closed position or unlocking the cover 14 allowing the cover 14 to rotate to an open position. The lock assembly 16 extends downwardly from an upper side of the top plate 70 to a bottom side of the top plate 70. The lock assembly 16 defines a latch 160 at a lower end thereof. The upper housing portion 17 and the lower housing portion 18 cooperate to define a housing for accommodating the main module 12 therein. The top plate 70 defines a through hole (not labeled) at a front corner thereof from which the latch 160 retractably protrudes. The top plate 70 defines a first connecting portion 52 near a back edge of the base 13. The top plate 70 defines a recessed medium-receiving portion 72 in the center thereof for receiving a medium (not shown). The medium-receiving portion 72 is adjacent to the first connecting portion 52. The medium-receiving portion 72 includes a substantially round bottom surface 720 and a sidewall 722 surrounding the bottom surface 720. An opening 724 is defined through the top plate 70 at the medium-receiving portion 72, extending radially from the center to a lateral edge of the medium-receiving portion 72. Therefore, the driving device 120 is allowed to rise up via the opening 720 to support the medium, and the pick-up unit 122 is allowed to move along a radial direction of the bottom surface 720 to reproduce information recorded in the medium.

Figure 2:
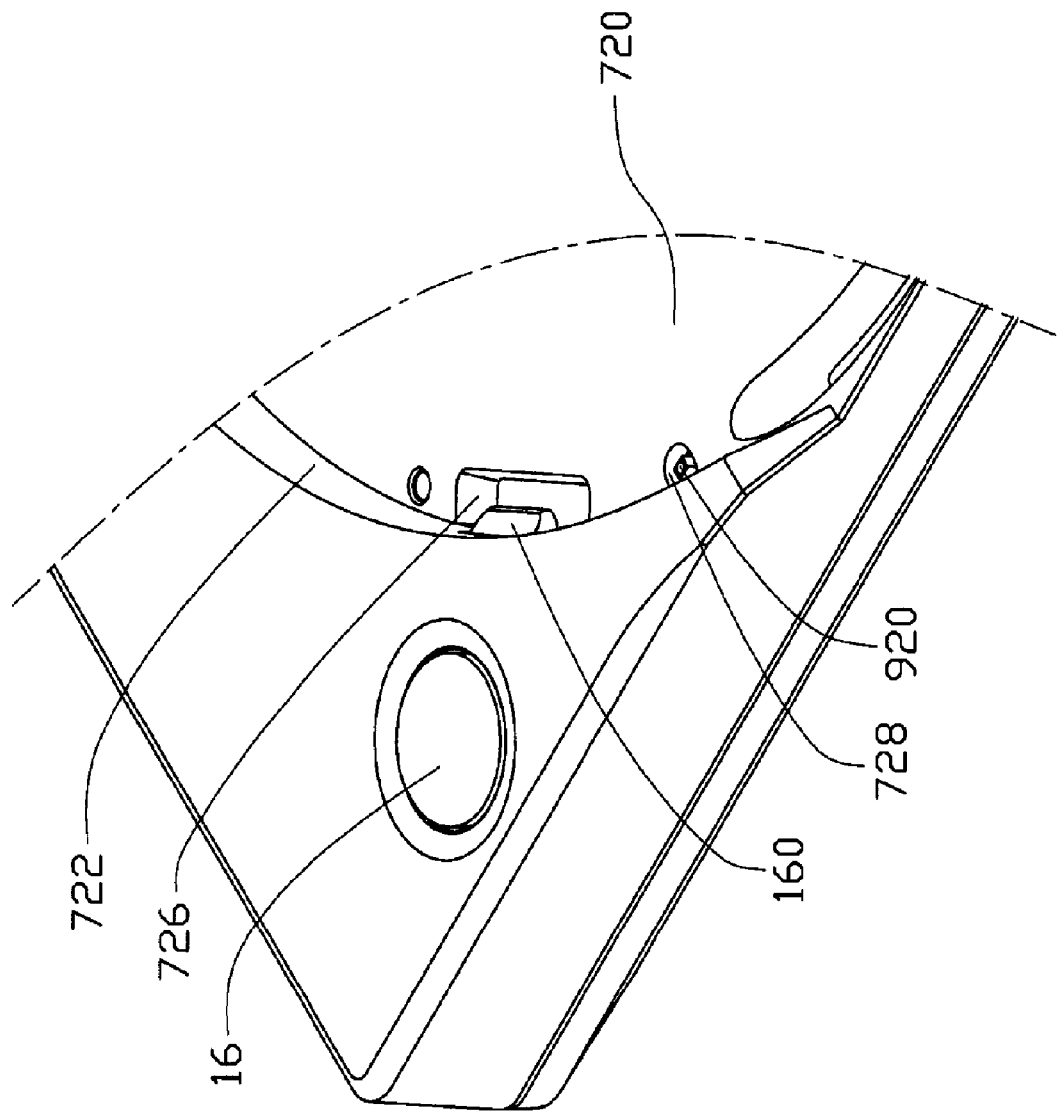
FIG. 2 is an enlarged, partial view of an upper housing portion of the storage medium player of FIG. 1.

Referring also to FIG. 2, the bottom surface 720 of the medium-receiving portion 72 defines a recessed portion 726. The sidewall 722 defines a through hole (not labeled) so that the lock assembly 16 is capable of extending out from the through hole to the recessed portion 726. The bottom surface 720 of the medium-receiving portion 72 further defines first and second through holes 728 and 729. The first and second through holes 728 and 729 are located respectively near front and back edges of the bottom surface 720.

Figure 3:
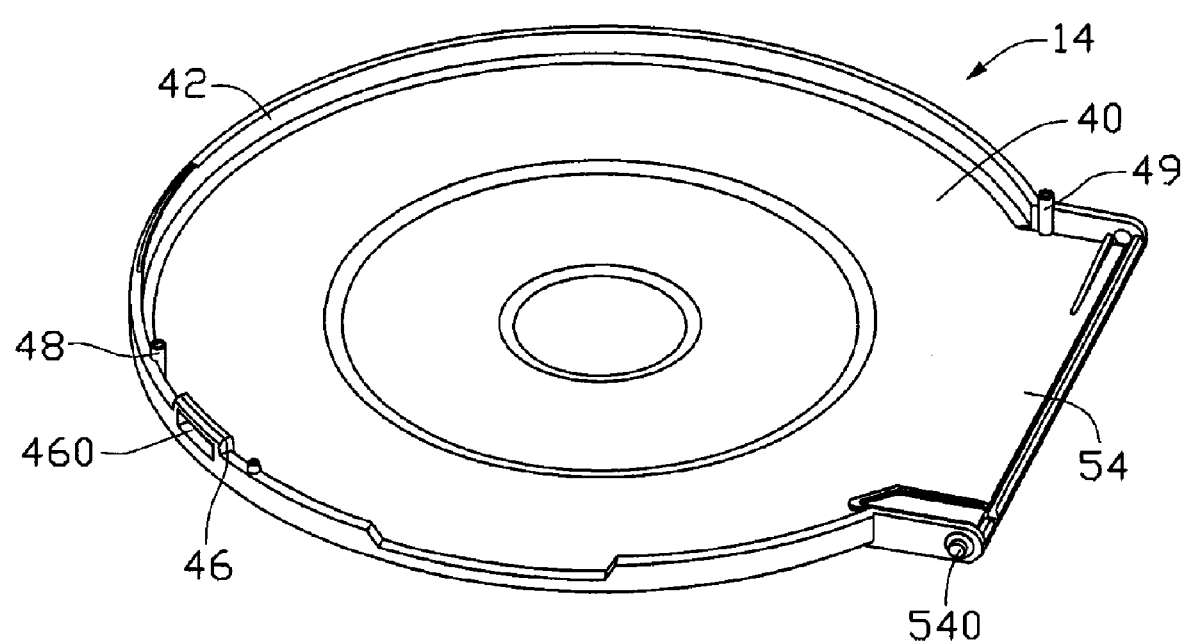
FIG. 3 is an inverted, isometric view of a cover of the storage medium player of FIG. 1.

Referring also to FIG. 3, the cover 14 forms a second connecting portion 54 at a back edge thereof, corresponding to the first connecting portion 52. The first connecting portion 52 defines a pair of pivot holes 520 at two opposite side edges thereof. The second connecting portion 54 includes a pair of pivots 540 at two opposite side edges thereof, corresponding to the pair of pivot holes 520. The pivots are configured for being rotatably received in the pivot holes 520. Therefore, the cover 14 is capable of being pivotally connected to the base 13. The cover 14 includes a top plate 40 adjacent to the second connecting portion 54, and a lateral surface 42 extending downwardly from the top plate 40. The top plate 40 of the cover 14 forms first and second posts 48 and 49 respectively corresponding to the first and second through holes 728 and 729. The first and second posts 48 and 49 are configured to be inserted into the through holes 728 and 729 to activate the safety device 129. The lateral surface 42 forms an engaging portion 46 corresponding to the recessed portion 726. The engaging portion 46 defines a latching hole 460 for receiving the latch 160. When the cover 14 is rotated to the closed position, the latch 160 protruding out from the though hole of the sidewall 722 inserts into the latching hole 460. Thus, the cover 14 is firmly locked at the closed position. When the lock assembly 16 is depressed, the latch 160 withdraws from the latching hole 460. Thus, the cover 14 is unlocked and is capable of being rotated to the open position.

The safety device 129 includes a first switch 92 and a second switch 94 connected in series with the first switch 92 in the control circuit. The first and second switches 92 and 94 are electrically connected in series with the driving device 120 in the control circuit. The first and second switches 92 and 94 are respectively located at front and back edges of the PCB 126 corresponding to the through holes 728 and 729. Both the first and second switches 92 and 94 are plunger switches with a same structure. The second switch 94 is provided for safety requirements. If the first switch is out of order, such as having a short circuit, the second switch 94 will serve as a back-up switch to control the working states of the driving device 120.

Figure 4:
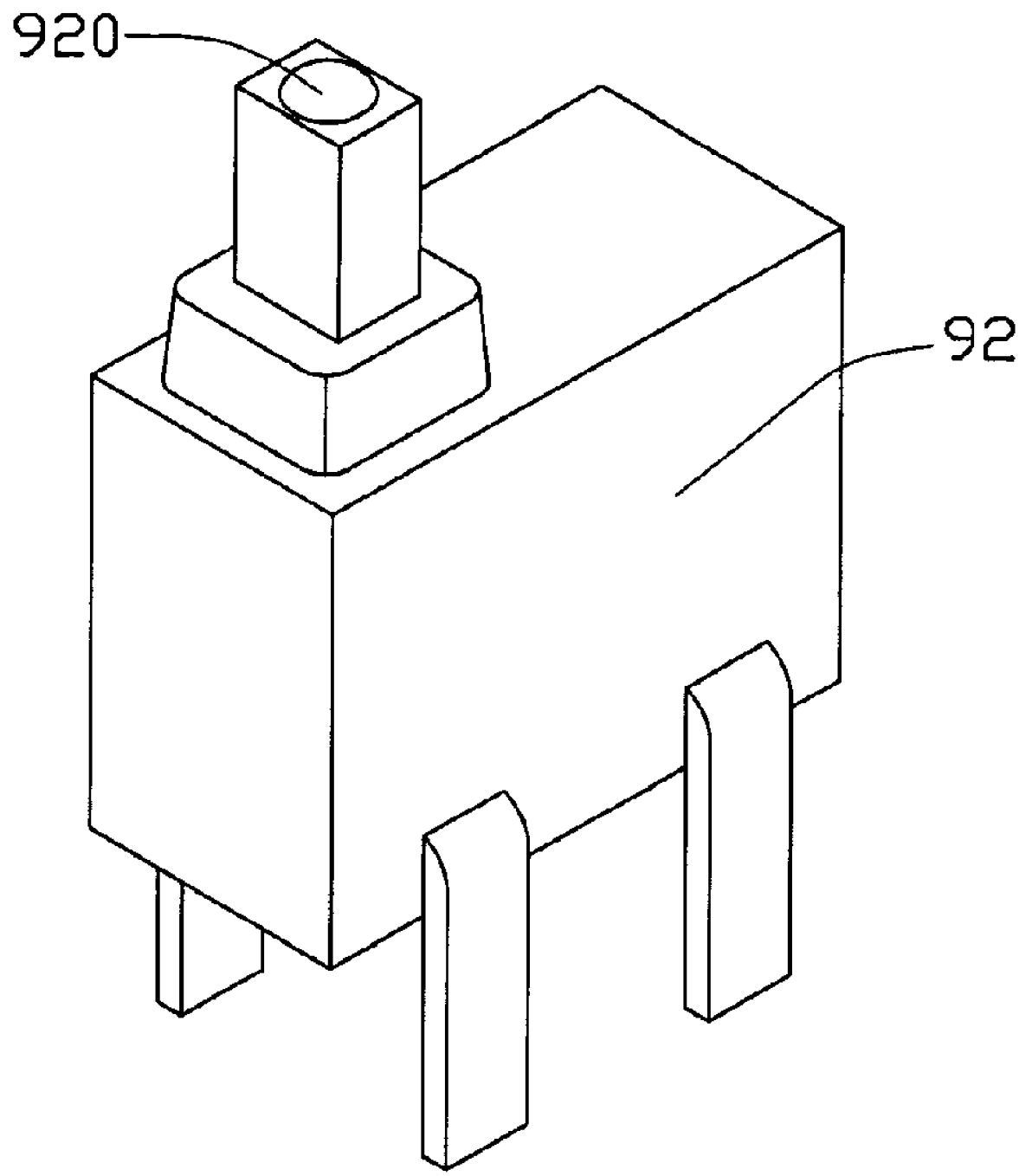
FIG. 4 is an isometric view of a first switch of the storage medium player of FIG. 1.

Referring also to FIG. 4, the first switch 92 includes a plunger 920 located below the through hole 728. In an alternative embodiment, the plunger 920 extends from the first switch 92 into the through hole 728 so that a portion of the plunger 920 is received in the through hole 728. When the plunger 920 is depressed, the first switch 92 is activated. When the plunger 920 is not depressed the first switch 92 is deactivated. The first and second switches 92 and 94 are electrically connected in series in the control circuit, either one of the first switch 92 and second switch 94 being deactivated will cause the driving device 120 to change to the second working state and cease operating.

As the cover 14 is rotated down, the second post 49 inserts into the through hole 729 depressing a plunger of the second switch 94. The second switch 94 is activated. Following the cover 14 being rotated further down, the first post 48 inserts into the first through hole 728 and depresses the plunger 920 of the first switch 92. The first switch 92 is thus also activated. Therefore, the driving device 120 changes to the first working state.

Figure 5:
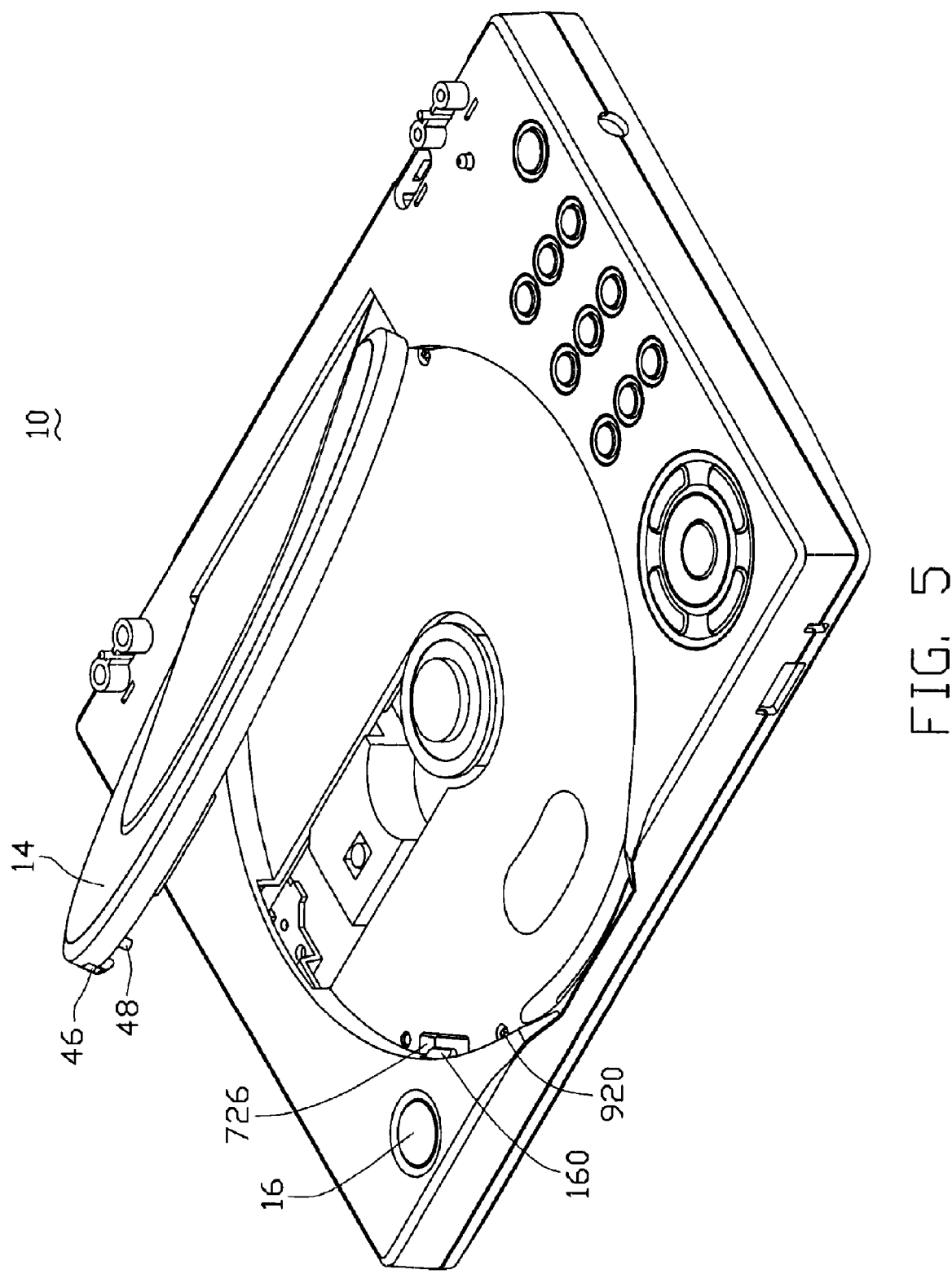
FIG. 5 is an assembled, isometric view of the storage medium player of FIG. 1, with the cover being located at an open position.

Referring also to FIG. 5, when a user wants to replace the original medium with another medium, the lock assembly 16 is pressed to release the engaging portion 46, and then the cover 14 is rotated away from the base 13. As the cover 14 rotates away from the base 13, the first post 48 withdraws releasing the plunger 920 deactivating the first switch 92 at a minimum height. The driving device 120 changes to the second working state and gradually the medium stops rotating. Once the cover 14 is at the open position the medium is rotating slowly if not actually stopped altogether. At that time, the medium is in a relatively stationary state and is not likely to hurt the user when the user reaches for the medium.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A safety device for a storage medium player, the storage medium player including a base defining a medium-receiving area, a driving device mounted in the base for driving a medium received in the medium-receiving area to rotate, and a cover configured for selectively covering the medium-receiving area, the safety device comprising a first switch and a second switch, the first switch being arranged at a front edge of the base, the second switch being electrically connected in series with the first switch and the driving device, wherein when the cover is closed, the first switch and the second switch are activated and the driving device is enabled; and when the cover is open, at least one of the first switch and the second switch is deactivated and the driving device is disabled.

2. The safety device as claimed in claim 1, wherein the cover forms a post extending down therefrom, the base defines a through hole at an upper housing portion thereof corresponding to the post so that the post is capable of extending through the though hole and depressing the first switch when the cover is closed.

3. The safety device as claimed in claim 1, wherein the first switch is a plunger switch having a plunger, the first switch is activated when the plunger is depressed.

4. The safety device as claimed in claim 1, wherein the second switch is arranged at a back edge of the base.

5. The safety device as claimed in claim 4, wherein the second switch is a plunger switch, the second switch is activated when the plunger is depressed.

6. The safety device as claimed in claim 5, wherein the cover forms a post extending down therefrom, the base defines a through hole at an upper housing portion thereof corresponding to the post so that the post extends through the though hole depressing the second switch when the cover is closed.

7. A storage medium player, comprising:
 a base, the base comprising a medium-receiving area, a driving device for driving a medium received in the medium-receiving area to rotate, and a safety device connected in series with the driving device and located at a front edge portion of the storage medium player;
 a cover pivotally connected to the base, the cover being configured for selectively covering the medium-receiving area;
 wherein the safety device is capable of toggling between an activated state and a deactivated state, the safety device comprising a first switch and a second switch, the second switch is electrically connected in series with the first switch and the driving device, when the cover is closed, the safety device is in the activated state, the first switch and the second switch are activated, and the driving device is enabled; when the cover is open, the safety device is in the deactivated state, the first switch and the second switch are deactivated, and the driving device is disabled.

8. The storage medium player as claimed in claim 7, wherein the first switch is arranged at a front edge of the base.

9. The storage medium player as claimed in claim 8, wherein the cover forms a post extending down therefrom, the base defines a through hole at an upper housing portion thereof corresponding to the post so that the post extends through the though hole depressing the first switch when the cover is closed.

10. The storage medium player as claimed in claim 8, wherein the first switch is a plunger switch having a plunger, the first switch changing from a deactivated state to an activated state when the plunger is depressed.

11. The storage medium player as claimed in claim 8, wherein the second switch is arranged at a back edge of the base.

12. The storage medium player as claimed in claim 11, wherein the second switch is a plunger switch, the second switch changes from a deactivated state to an activated state when the plunger is depressed.

13. The storage medium player as claimed in claim 11, wherein the cover forms a post extending down therefrom, the base defines a through hole at an upper housing portion thereof corresponding to the post so that the post extends through the though hole depressing the second switch when the cover is closed.

14. A storage medium player comprising:
a base defining a medium-receiving area;
a driving device mounted in the base for driving a medium that is received in the medium-receiving area;
a cover pivotably attached to the base adjacent one side of the medium-receiving area; and
a safety device mounted in the base adjacent an opposite side of the medium-receiving area, the safety device comprising a first switch and a second switch, the first switch and the second switch being electrically connected in series with the second switch and the driving device, the safety device being capable of being switched between an activated state and a deactivated state upon pivoting the cover with respect to the base, wherein when the cover is closed, the safety device is in the activated state, the first switch and the second switch are activated, and the driving device is enabled; when the cover is open, the safety device is in the deactivated state, the first switch and the second switch are deactivated, and the driving device is disabled.

15. The storage medium player as claimed in claim 14, wherein the first switch and the second switch are plunger switches, each having a plunger, the plunger switch changing from the deactivated state to the activated state when the plunger is depressed.

16. The storage medium player as claimed in claim 15, wherein the cover forms two posts extending down therefrom, the base defines two through holes adjacent the opposite side of the medium-receiving area corresponding to the two posts so that the two posts extend through the two through holes depressing the first switch and the second switch respectively when the cover is closed, the two posts move out from the two through holes releasing the first switch and the second switch when the cover is opened.

17. The storage medium player as claimed in claim 15, wherein the first switch and the second switch are located at adjacent two sides of the medium-receiving area.

* * * * *